(12) United States Patent
Marfia et al.

(10) Patent No.: US 12,184,701 B2
(45) Date of Patent: Dec. 31, 2024

(54) METHOD AND DEVICES FOR LAWFUL INTERCEPTION

(71) Applicant: Telefonaktiebolaget LM Ericsson (PUBL), Stockholm (SE)

(72) Inventors: Francesca Marfia, Pagani (IT); Chiara Santella, Nocera Inferiore (IT); Antonio Luisi, Baronissi (IT); Abramo Marino, Caivano (IT); Luciano Orabona, Caserta (IT); Vincenzo Cuniato, Acerra (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 262 days.

(21) Appl. No.: 17/785,987

(22) PCT Filed: Dec. 18, 2019

(86) PCT No.: PCT/IB2019/061044
§ 371 (c)(1),
(2) Date: Jun. 16, 2022

(87) PCT Pub. No.: WO2021/123882
PCT Pub. Date: Jun. 24, 2021

(65) Prior Publication Data
US 2023/0027052 A1 Jan. 26, 2023

(51) Int. Cl.
*H04L 29/06* (2006.01)
*H04L 9/40* (2022.01)
*H04W 12/80* (2021.01)
*H04W 36/14* (2009.01)

(52) U.S. Cl.
CPC ............ *H04L 63/20* (2013.01); *H04L 63/306* (2013.01); *H04W 12/80* (2021.01); *H04W 36/1443* (2023.05)

(58) Field of Classification Search
None
See application file for complete search history.

(56) References Cited

U.S. PATENT DOCUMENTS

2009/0207751 A1* 8/2009 Attanasio .............. H04W 12/80
370/252

FOREIGN PATENT DOCUMENTS

EP 2 792 182 6/2013
EP 2792182 B1 * 9/2018 ........... H04L 43/028

OTHER PUBLICATIONS

3GPP TS 33.108 v15.6.0; Technical Specification; 3rd Generation Partnership Project; Technical Specification Group Services and System Aspects; 3G security; Handover interface for Lawful Interception (LI) (Release 15)—Sep. 2019.
ATIS Standard, Lawfully Authorized electronic Surveillance (LAES) for 3GPP IMS-based VoIP and other Multimedia Services (ATIS-0700005.v002)—2017.

(Continued)

*Primary Examiner* — Andrew J Steinle
(74) *Attorney, Agent, or Firm* — Baker Botts L.L.P.

(57) ABSTRACT

Methods and devices provide service-specific information besides LI data extracted from communications of LI targets, which receive services via the network and interact with a core function of the network. LI data includes at least one of IRI and CC. This approach is particularly useful if LI at application/service level is unavailable.

18 Claims, 9 Drawing Sheets

(56) References Cited

OTHER PUBLICATIONS

Early Media and Ringing Tone Generation in the Session Initiation Protocol (SIP) by G. Camrillo et al.—Dec. 2004.
ETSI TS 102 232-1 v3.19.1; Technical Specification; Lawful Interception (LI); Handover Interface and Service-Specific Details (SSD) for IP delivery; Part 1: Handover specification for IP delivery—May 2019.
ETSI TS 102 232-5 v2.5.1; Technical Specification; Lawful Interception (LI); Handover Interface and Service-Specific Details (SSD) for IP delivery; Part 5: Service-specific details for IP Multimedia Services—Oct. 2010.
GSMA, IMS Profile for Voice and SMS, Version 9.0; Official Document IR.92-IMS Profiled for Voice and SMS—Apr. 8, 2015.
PCT Notification of Transmittal of the International Search Report and the Written Opinion of the International Searching Authority, or the Declaration issued for International application No. PCT/IB2019/061044—May 28, 2020.

\* cited by examiner

```
{
    "Service-identification-rules":
    {
        "SDP" : "present",
        "media-protocol" : "MSRP",
        "early-media-detection" : true,
        "Service-media":
        {
           "message-type" : "SIP message",
           "header-type" : "m line"
        },

"user-related-signaling" : "Content-Type:message/cpim",
        "signaling-to-media-correlation" : "imdn.Message-ID",
    }, "Service-characteristics":
    {
        "service-ID" : "RCS IM",
        "service-mode" : "session-mode",
        "user-related-sgnaling" : true,
        "user-related-signaling-type" : "IMDN notification",
        "user-related-content-type" : "IM",
        "early-media-allowed" : true
    }, "service-policies":
    {
        "session-based-correlation" : true,
        "user-related-correlation" : true,
        "service-based-formatiing" : true,
    }

METHOD AND DEVICES FOR LAWFUL INTERCEPTION

PRIORITY

This nonprovisional application is a U.S. National Stage Filing under 35 U.S.C. § 371 of International Patent Application Serial No. PCT/IB2019/061044 filed Dec. 18, 2019 and entitled "Method and Devices for Lawful Interception" which is hereby incorporated by reference in its entirety.

TECHNICAL FIELD

Embodiments of the subject matter disclosed herein generally relate to methods and devices for lawful interception ("LI").

BACKGROUND

LI is the process of selectively forwarding communication-related information to law enforcement agencies ("LEAs") with legal authorization to record information and/or content of certain network users, called LI targets. Communications Service Provider ("CSP") is a term used in LI standard documents (e.g., ETSI TS 102 232-1, V3.19.1 of May 2019) when referring to organizations (such as Service Providers ("SvP"), Network Operators ("NWO") or Access Providers ("AP")) that are required to enable LI.

Figure 1:
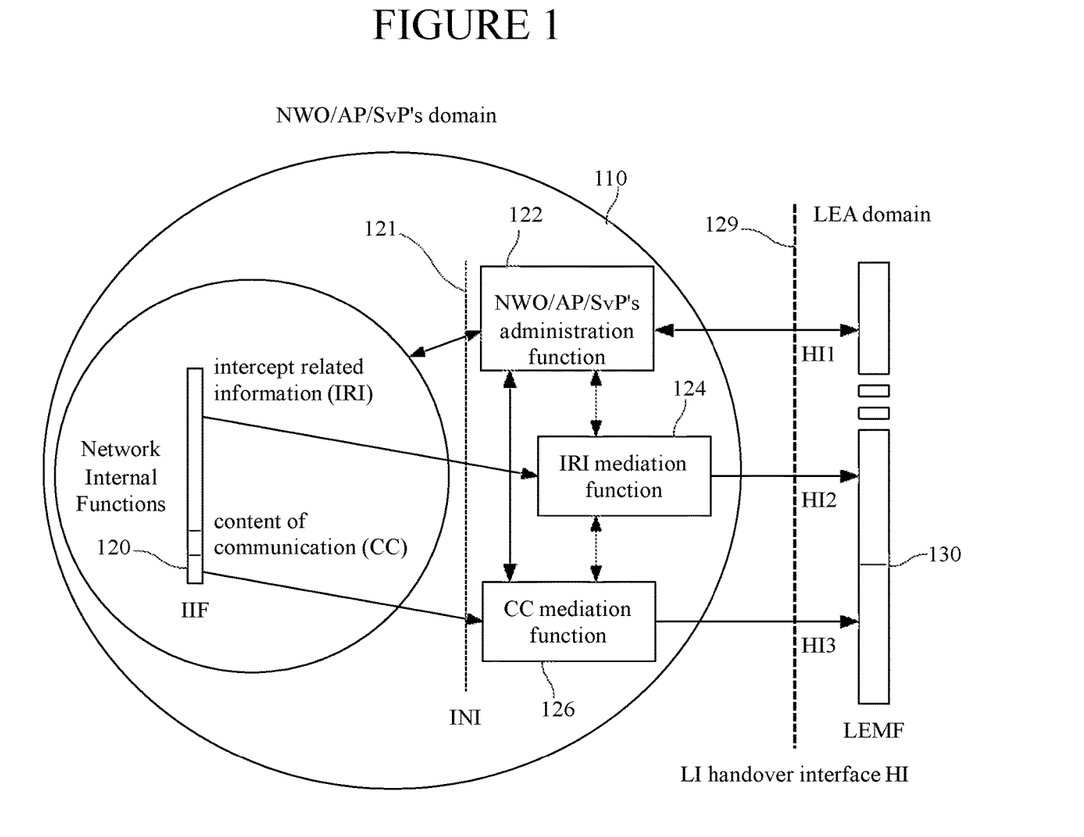
FIG. 1 illustrates a logical representation of the functional entities achieving LI.

FIG. 1, which is reproduced from a recent standard document (3GPP TS 33.108 entitled, "Handover interface for Lawful Interception," release 15, version 15.6.0), is a logical representation of the functional entities achieving LI. Within NWO/AP/SvP's domain 110, internal interception functions (IIF) 120 retains LI data (e.g., Intercept-Related Information, IRI, and Content of Communication, CC), related to any communication process in which an LI target is a party. Further, functions that receive LI data via internal network interface INI 121 mediate communication with the LEA domain. These functions (i.e., administration function 122, IRI mediation function 124 and CC mediation function 126) feed LI data via an LI handover interface 129 to the lawful enforcement monitoring facility (LEMF) 130. LI handover interface 129 has three ports (also named interfaces): HI1 for administrative information, HI2 for delivering IRI and HI3 for delivering CC.

Figure 2:
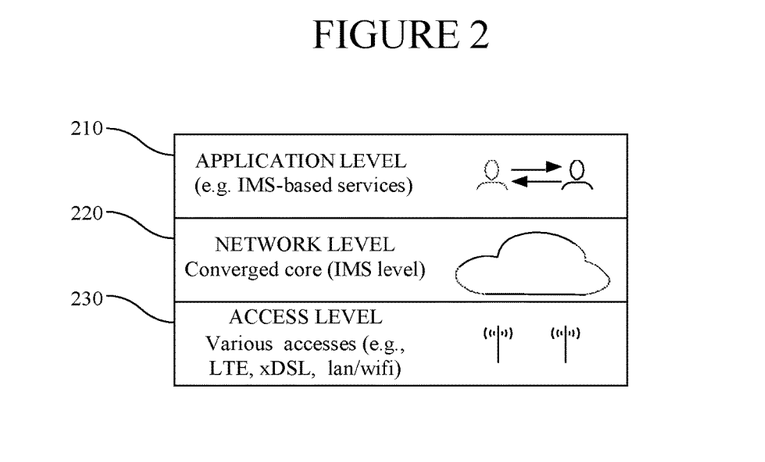
FIG. 2 illustrates different levels at which a CSP can capture LI data.

From the LI point of view, the information that a CSP is expected to provide to a LEA is based on the level of the service the CSP provides. For example, when an NWO provides Internet access, the NWO can be expected to provide a copy of the IP packets it transports. FIG. 2 illustrates different levels (sometimes also named layers) at which a CSP can operate: access level 230, network level 220 and application level 210. At the access level, the CSP captures network access-related communications of an LI target accessing the network (e.g., bearer activation). At network level, the CSP captures communications of an LI target interacting with one or more core functions of the network (e.g., communication related to LI target's registration to an IMS node, such as, a SIP registration). Note that this LI-related model is not directly mappable to a TCP/IP or OSI stack models.

At application level, the CSP captures all LI target's communications while using IMS-based services/applications. For example, if the LI target uses a messaging application such as Whatsapp, notification events such "message delivered", "message sent" that include LI target's IMDN are captured at application level. In another example, LI target's communications while using Rich Communication Suite (RCS) services based on an IMS domain are captured at the application level. Note that network level 220 is also called IMS level.

Figure 3:
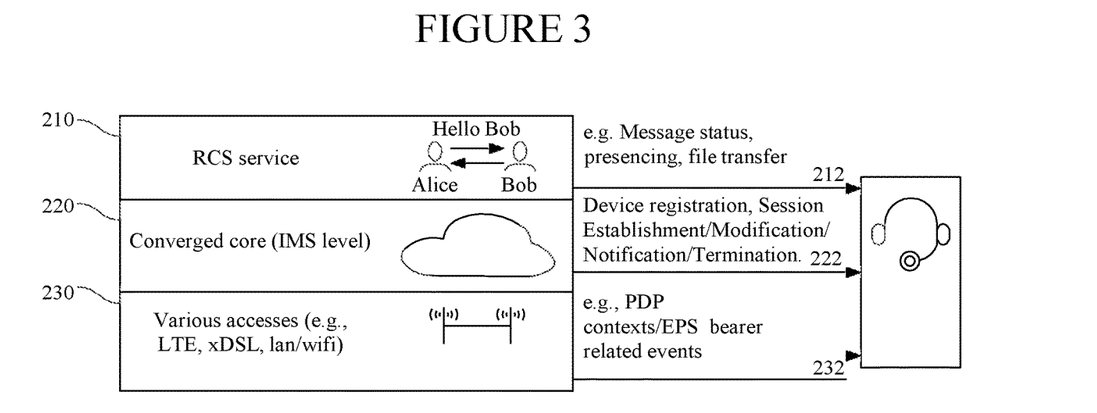
FIG. 3 exemplifies communications intercepted at each level.

As illustrated in FIG. 3, the CSP intercepts different information at different levels. If the CSP intercepts LI data at access level 230, LEA receives also information 232 related to the access (such as, PDP contexts or bearer-related events in case of 3G/4G network accesses). If the CSP intercepts LI data at network level 220, LEA also receives session initiation protocol, SIP, signaling 222 related to device registration into an IMS platform, session establishment (including media negotiation), session modification or termination, as well as in-session notifications. If the CSP intercepts LI data at application level 210 (as in case of RCS services as an example of specific Over-The-Top, OTT, application), LEA also receives data 212 such as message status, presencing (i.e., an example of application level functionality relating the user presence online), and file transfer.

In some circumstances, CSPs may find it difficult to intercept LI target's communications at the application level, especially when the application-level transactions are processed by off-the-shelf equipment (e.g., service offered by an OTT—equipment) that the CSP is unable to alter. The CSP may then try to use LI target's communications intercepted at the network level for LI. This alternative is only acceptable subject to circumstances agreed upon by the CSP and LEA (see, e.g., standard document ETSI TS 102 232-1 entitled, "Lawful Interception (LI); Handover Interface and Service-Specific Details (SSD) for IP delivery; Part 1: Handover specification for IP delivery," V3.19.1).

The proliferation of IMS-based services (e.g., VoLTE, Video Call, SMSoIP and RCS) affects LI because a new type of information is intercepted at the network level. Here VoLTE stands for Voice over Long-Term Evolution, which is a standard for high-speed wireless communication for mobile phones (UEs) and data terminals—including Internet of Things (IoT) devices and wearables. VoLTE is based on the IMS with specific profiles for control and media planes of voice service on LTE defined by GSMA in PRofile official Document (PRD) IR.92.

Current LI standards directed to LI of traffic at network level (e.g., 3GPP 33.108 v. 15.6.0, ETSI TS 102 232-5 v2.5.1, ATIS-0700005, v002) are not suitable for the interception of traffic at a higher level (e.g., RCS traffic). The lack of standardization specific for each service causes some problems for both the LEA and the CSP.

If the CSP performs LI at network level 220, the intercept-related information, IRI, delivered to the LEA via HI2 interface includes the SIP signaling, and content of communication, CC, delivered via HI3 represents transferred media (i.e., video, audio, instant messaging using RTP, MSRP or UDPTL). If CSP performs LI at application level 210, the IRI-CC definitions at the network level may no longer be valid, depending on the specific services.

For example (example is intended as an illustration not a limitation), in an RCS messaging situation illustrated in FIG. 3, two users (Alice and Bob) chatting are able to see the notifications "is delivered" and "is displayed." These are instant message disposition notifications, IMDNs, which from an LI point of view could be considered as signaling related to the messages exchanged by end users. These notifications can be located both in SIP signaling and in message session relay protocol, MSRP, packets. Therefore, such notifications may be embedded inside both IRI and CC.

In another example, content of "early media" communication was carried inside the SIP signaling. The term "early media" is defined in RFC3960 and refers e.g. to the message content within the SIP signaling. Thus, in the situations described in these examples, (i.e., intercepting an RCS service at network level 220 and "early media"), LI targeted content and signaling are mixed. In the RCS messaging session situation, the LEA is not able to have real-time evidence of signaling at the user level (i.e., IMDNs), nor to correlate them with related messages. Consequently, the CSP's LI mediation system is unable to differentiate the intercepted signaling and the content causing issues during live/testing activities or troubleshooting phases.

It is unrealistic to expect standards be generated in pace with application development and/or being adopted by each application, because such an approach is a time and resource burden for both CSPs and OTT manufacturers.

Therefore, it is desirable to develop techniques for solving the above-identified issues related to LI when LI data is related to services and intercepted at network level.

The meanings of some abbreviations used in this document are explained below:
3GPP 3$^{rd}$ Generation Partnership Project
CC Content of Communication
HI (LI) Handover Interface
HI2 (LI) Handover Interface for IRI reporting
HI3 (LI) Handover Interface for CC reporting
IM Instant Messaging
IMDN Instant Message Disposition Notification
IMS IP Multimedia Subsystem
IP Internet Protocol
IRI Intercept Related Information
LEA Law Enforcement Agency
LEMF Law Enforcement Monitoring Facility
LI Lawful Intercept
MF2 Mediation function for IRI reporting
MF3 Mediation function for CC reporting
MSRP Message Session Relay Protocol
NWO Network Operator
OSI Open Systems Interconnection
OTT Over-The-Top
RCS Rich Communication Suite
RTP Real-time Transport Protocol
SIM Subscriber Identity/Identification Module
SIP Session Initiation Protocol
SMSoIP Short Messaging System over Internet Protocol
TCP/IP Transmission Control Protocol/Internet Protocol
UDPTL User Datagram Protocol Transport Level.

SUMMARY

Various embodiments described hereinafter alleviate the above-identified problems with LI data associated with a service provided to an LI target if interception at service/application level is unavailable. LI data is extracted from communications at network level (i.e., communications of the LI target with core functions of the network).

According to an embodiment, there is a method for LI performed by a device of CSP, the device having access to a communication of an LI target interacting with at least one core function of a network. The method includes extracting LI data from the communication and determining whether there is an association between the LI data and a service provided to the LI target via the network. The method further includes forwarding service-LI messages that includes service-specific information besides the LI data, to a LEA, if determined that the association exists. The LI data includes at least one of IRI and CC.

According to another embodiment, there is a CSP device for LI. The device has a communication interface configured to communicate via a network, and a data processing unit connected to the communication interface. The data processing unit is configured to extract LI data from a communications of an LI target interacting with at least one core function of the network, to determine whether there is an association between the LI data and a service provided to the LI target via the network, and if determined that the association exists, to generate one or more service-LI messages, which include service-specific information besides the LI data, to be forwarded to a law enforcement agency, LEA, via the communication interface. Here again the LI data includes at least one of IRI and CC.

According to yet another embodiment, there is a computer-readable recording medium non-transitorily storing executable codes, which, when executed by a processor with access to a communication between an LI target and at least one core function of a network make the processor perform a method for LI. The method includes extracting LI data from the communication and determining whether there is an association between the LI data and a service provided to the LI target via the network. The method further includes one or more service-LI messages that include service-specific information besides the LI data to a LEA, if determined that the association exists. The LI data includes at least one of IRI and CC.

According to yet another embodiment, there is a computer program that makes a device of a CSP with access to a communication of an LI target with at least one core functions of a network to perform following LI-related actions: (A) extracting LI data from the communication, (B) determining whether there is an association between the LI data and a service provided to the LI target via the network, and (C) if determined that the association exists, to generate one or more service-LI messages, which include service-specific information besides the LI data, for forwarding to a law enforcement agency, LEA. The LI data includes at least one of IRI and CC.

According to another embodiment, there is a CSP device having (1) a transceiver configured to receive a communication of an LI target interacting with at least one core function of a network, (2) an LI data extraction module configured to extract LI data from the communication, (3) a service-LI data association seeker configured to determine whether there is an association between the LI data and a service provided to the LI target via the network, and (4) a service-LI message generator configured, if the association exists, to generate one or more service-LI messages, which include service-specific information besides the LI data, to be forwarded to a law enforcement agency, LEA, via the transceiver. The LI data includes at least one of IRI and CC.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The issues related to LI at network level (i.e., when CSP is not able to provide LI at application level) are solved by performing a service-aware LI. That is, the CSP device extracts LI data from captured communications of an LI target interacting with core functions of a network (i.e., at network level). The LI data includes at least one of intercept related information and communication content. If determined that there is an association between the LI data and a service provided to the LI target via the network, service-LI messages, which include service-specific information besides the LI data, are forwarded to the respective LEA. A core function is here defined as a function in a core network of a network, such as a wireless communications network in the form of an IMS core network. An IMS device/node in an IMS core network may of course as such include more than one core function. Examples of a core functions in the IMS core network are P-CSCF (Proxy-Call Session Control Function), S-CSCF (Serving-CSCF), I-CSCF (Interrogating-CSCF), Home Subscriber Server (HSS) and Subscription Locator Function (SLF). For example, a SIP registration as an IMS level registration involves a SIP REGISTER request where a user binds his/her public identity in the form of a public URI to a URI that contains the host name or IP address of an associated UE/LI target. The registration at the IMS level involves the core functions P-CSCF, I-CSCF, HSS and S-CSCF.

Figure 4:
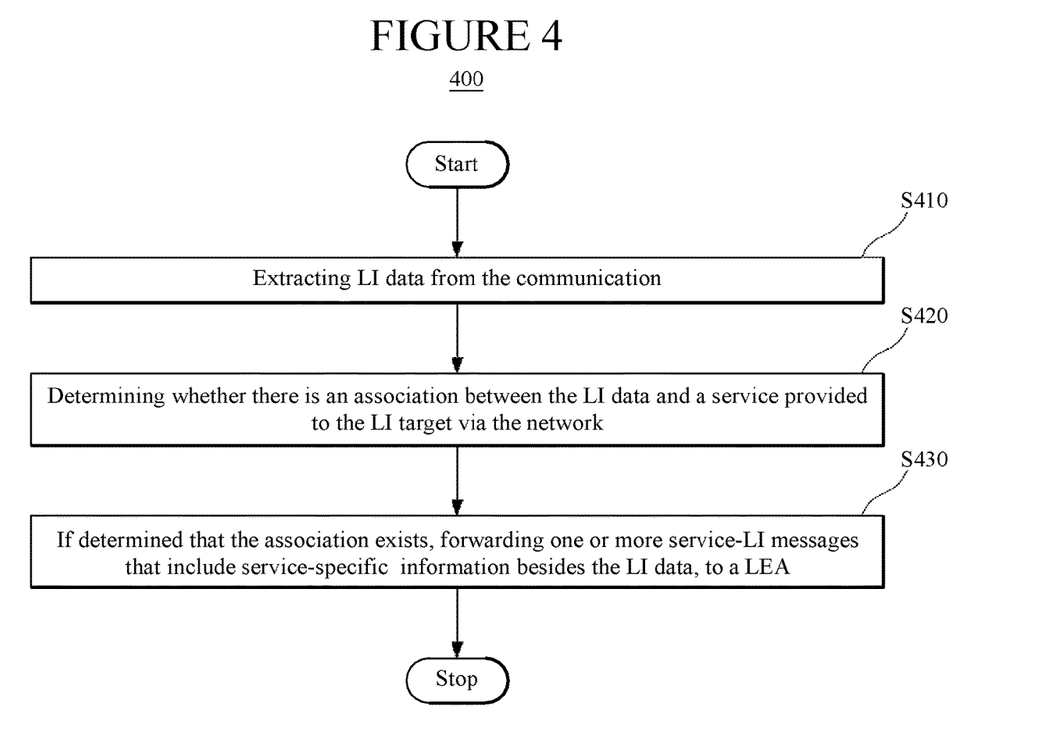
FIG. 4 is a flowchart of a method according to an embodiment.

FIG. 4 is a flowchart of a method (400) for service-aware LI according to an embodiment. The method is performed by a device of a CSP having access to a communication of an LI target interacting with one or more core functions of the network. Such communications are captured for LI. LEAs may want to intercept a specific person's communications. From an LI perspective, a person may own one or more devices (identified for example by an IMEI), a SIM/ISIM/USIM (identified by an MSISDN) and included in a UICC/eUICC/iUICC, or a user identity (e.g., an URI). The term "LI target" is to be interpreted in the broadest manner as covering any physical entity associated with a person and could be any type of device such as a mobile phone, vehicle, tablet, laptop and a smart watch/wearable.

Method 400 includes extracting LI data from the communication at S410 and determining whether there is an association between the LI data and a service provided to the LI target via the network at S420. The LI data includes IRI and/or CC. The method further includes forwarding one or more service-LI messages, which include service-specific information besides the LI data, to a LEA at S430.

As articulated in the "Background" section, the LI problems that arise in the conventional approach to forwarding LI data captured at network level and associated with a service are:

a. lack of visibility of service-specific events (e.g., because such event is embedded in the SIP signaling);

b. loss of IRI service-specific events when CC interception not required or allowed and IRI are embedded in CC (e.g., in countries where only IRI can be lawfully intercepted);

c. correlation problems due to the challenge of linking IRI and CC;

d. delay in processing on the LEA side when absence of clear distinction between IRI and CC requires time-consuming post-processing on the LEA side.

The embodiments described in this section provide advantages for CSPs and LEAs, and more generally to all actors in the network community by providing service-aware LI, eliminating the need to deal with the above-identified problems in the standardization phase, making it easier also for application developers to test and troubleshoot their applications under development (e.g., via a more reliable statistics). This approach reduces the cost for monitoring LI targets by simplifying post-processing of LI data. For example, in case of RCS services provided as a specific OTT application, a LEA receiving LI data from a CSP using the above method has the IRI events specific for the RCS application highlighted, always delivered via HI2 (not both HI2 and HI3), and always available even if CC interception is not allowed. Therefore, the LEA more easily correlates IRI events specific to the OTT application and pertaining to the same communication regardless of whether they are delivered in SIP or MSRP messages. Furthermore, the embodiments enable an easy correlation between IRI and CC of the same communication, even when delivered inside standalone SIP messages (e.g., in the case of pager mode).

Figure 5:
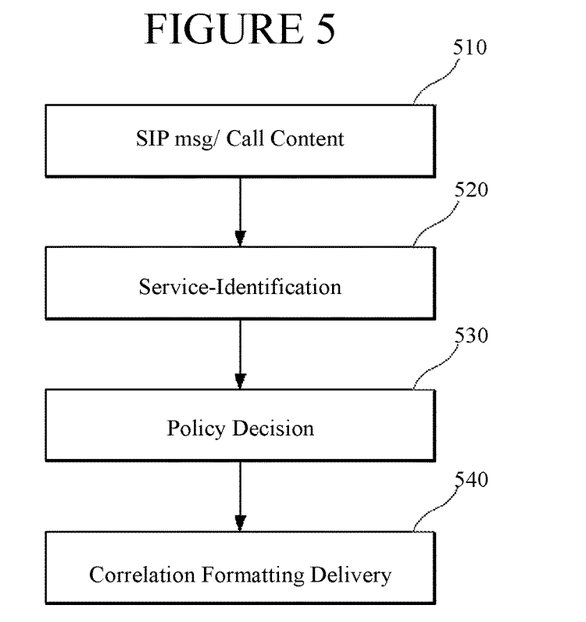
FIG. 5 illustrates a service analysis according to an embodiment.

FIG. 5 illustrates a service analysis performed for an IRI (SIP message) or a CC packet within the service-aware LI at a network level (within the meaning of the description related to FIG. 2). These operations may be performed by a mediation module (e.g., including mediation/delivery functions 124 and 126 in FIG. 1, these functions being upgraded to enable service-awareness) of the CSP. The operations include (e.g., by a CSP device containing a mediation function): receiving LI data (i.e., the SIP message or the call content) at 510, identifying an IMS-based service associated with the LI data at 520, extracting user-related signaling and media of services according to service policies (i.e., a policy decision) at 530, and delivering LI data and the additional information at 540.

Figure 6:
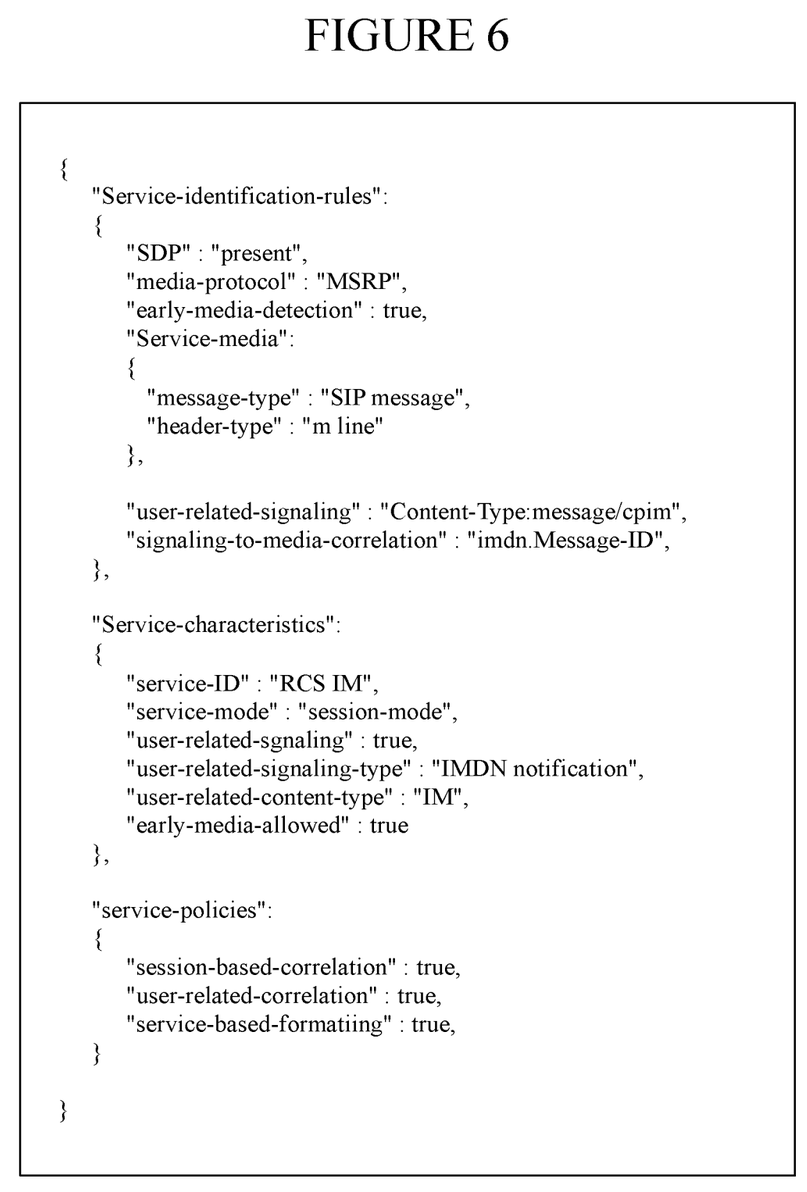
FIG. 6 is an exemplary illustration of a SID for an RCS service as specific OTT application according to an embodiment.

It is in service identification 520 determined whether an IMS service is associated with the LI data and which is the IMS-based service. According to one embodiment, this functionality is achieved with a service function (SF) and a data structure storing service-related information. A service is uniquely identified based on service-related information stored in a service identity structure (SID). The service-related information includes service-identification-rules, service-characteristics and service-policies. FIG. 6 exemplarily illustrates a SID for an RCS service as a specific OTT application.

Figure 7:
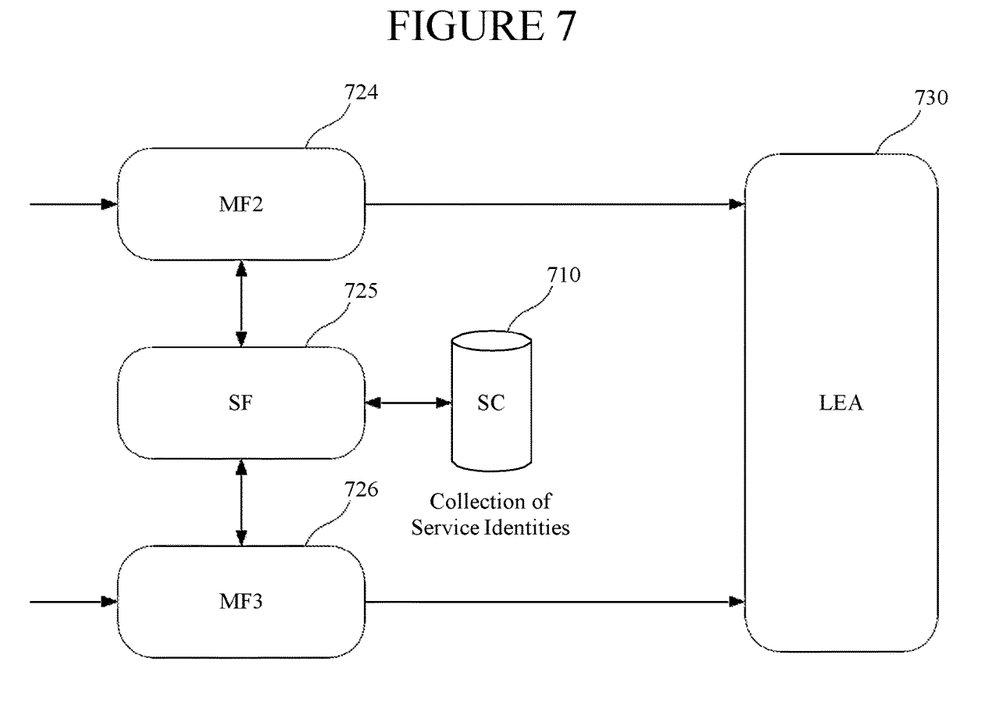
FIG. 7 is a functional illustration of SF within the LI functional blocks according to an embodiment.

FIG. 7 is a functional illustration of SF 725 within LI functions according to an embodiment. SF 725 communicates with IRI mediation function (MF2) 724 (which is a service-aware version of function 124), with CC mediation function (MF3) 726 (which is a service-aware version of function 126), and service collector SC 710. SC 710 stores service structures, i.e. a collection of service descriptions, similar with the one in FIG. 6. The service structures may be input to the service collector manually or be downloaded from predetermined documents. MF2 724 and MF3 726 forward LI data including service-related information to LEA 730.

Figure 8:
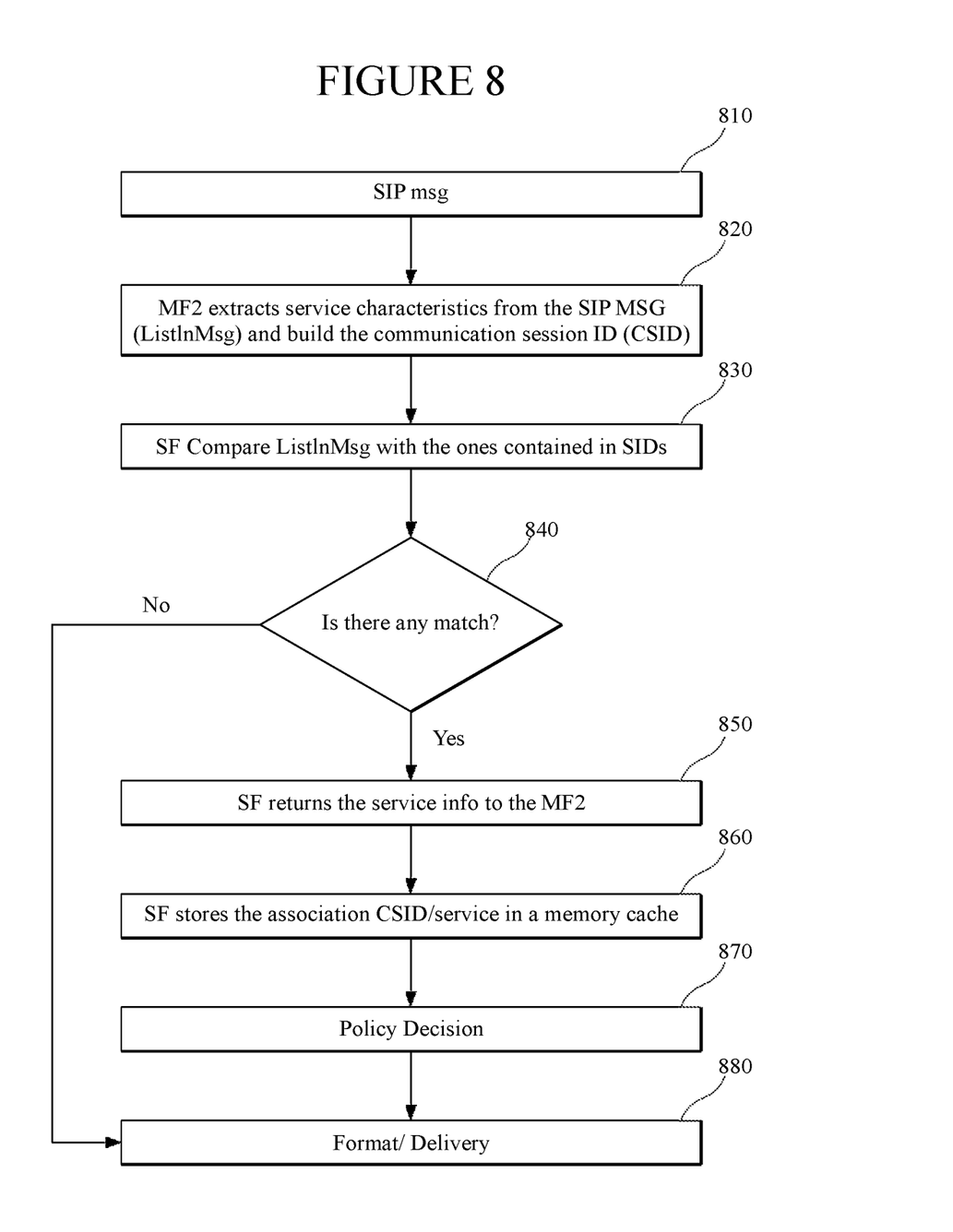
FIG. 8 describes interfaces between a service function and other LI functional entities upon intercepting a SIP message, according to an embodiment.
Figure 9:
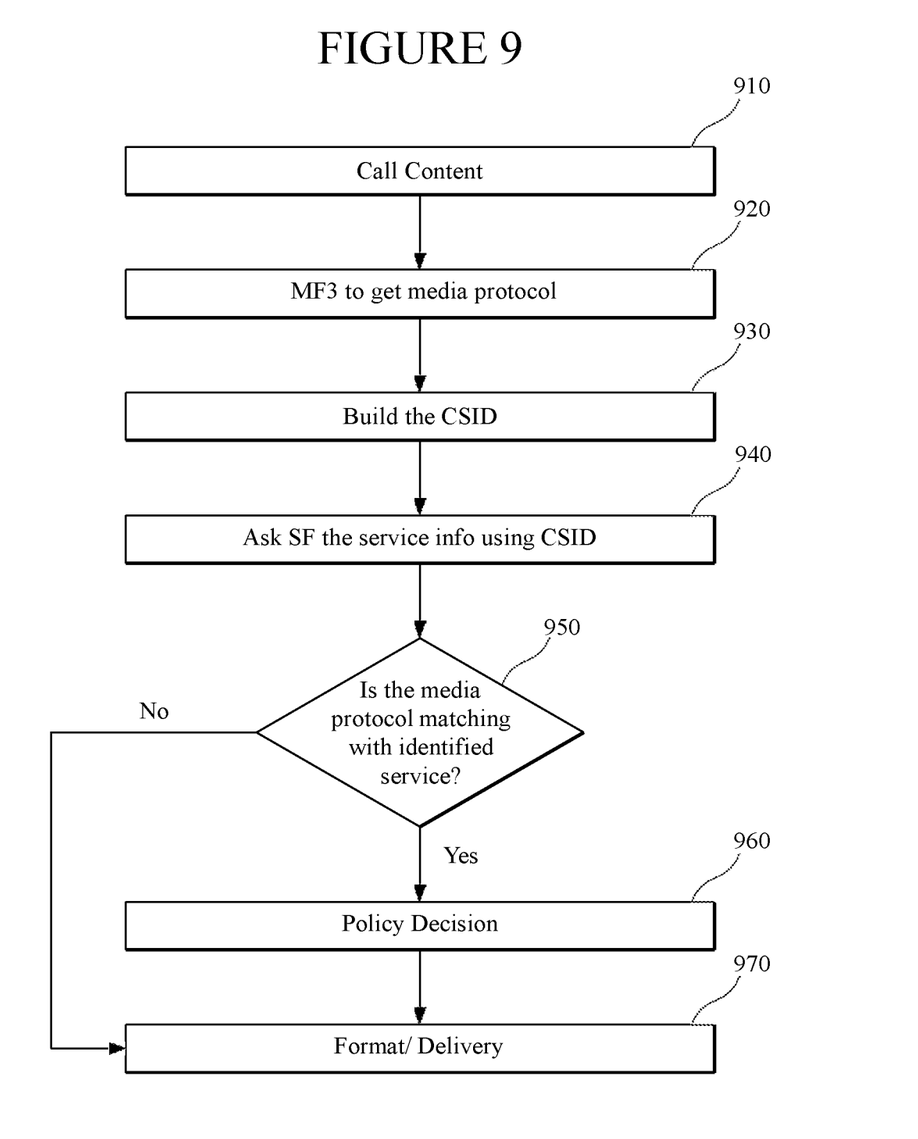
FIG. 9 describes interfaces between a service function and other LI functional entities upon intercepting a CC message according to an embodiment.

FIGS. 8 and 9 describe interactions between an SF (such as 725 in FIG. 7) and other LI functions (e.g., MF2 and MF3). SF interacts with MF2 and MF3 to provide them the list of known services to be identified and with SC to check the presence of a service (identification process).

FIG. 8 illustrates service identification when a SIP message is intercepted at 810. MF2 extracts service characteristics (ListInMsg) from the SIP message and builds a communication session identifier (CSID) at 820. Here, CSID is a generic communication session identifier used for correlation purposes, which may also be used to correlate the user-related-signaling to the original message, X2 or X3. A definition of CSID called the Communication Identity Number (CIN) is found in ETSI TS 101 671 V3.15.1: "Lawful Interception (LI); Handover interface for the lawful interception of telecommunications traffic"). The assignment of CIN in IMS domain is described in ETSI TS 102 232-5. CIN identifies uniquely an intercepted communication session within the relevant network element. All the results of interception within a single communications session must have the same CIN.

At 830, the SF compares the extracted service characteristics (ListInMsg) with the ones in SI Ds stored in the SC. If there is no match (i.e., the received information is not associated with an IMS service), the received information is delivered at 880 (see branch NO of decision block 840).

On the other hand, if the extracted service characteristics (ListInMsg) match one of the SIDs stored in the SC (see branch YES of decision block 840), then SF returns "service-policies" of the matched SID to MF2 at 850 and stores the associated CSID-service in a memory cache at 860. Steps 870 (Policy Decision) and 880 (Format/Delivery) are going to be discussed in more detail below.

FIG. 9 illustrates service identification when a CC packet is received at 910. At 920, MF3 retrieves media protocol (i.e., one of the media protocols depending on the service, e.g., RTP) from the received CC. Then, at 930, MF3 builds a CSID used, at 940, to ask SF to verify if there is an associated service (already stored if another packet was previously received). If there is no match, the received information is delivered at 970 (see branch NO of decision block 950) without service-related information, otherwise the CC packet is forwarded to steps 960 (Policy Decision) and 970 (Format/Delivery) that, similar to 870 and 880, are going to be discussed below.

At steps 870 and 960, MF2 and MF3 respectively retrieve the service policies. These policies may indicate whether it is necessary to provide a service-related correlation (such as IMDN to IM correlation in case of RCS messaging). Depending on the service, such information is built and then the IRI/CC type of information is subjected to formatting/delivery steps 880 and 970, respectively.

When an association of LI data with an IMS service has been identified, the user-related-signaling and/or user-related-content (IRI/CC) messages are formatted by a serviceIri delivered over HI2 to LEA and a servicePayload delivered via HI3, respectively. The serviceIri message encapsulates service-related information besides the IRI type of information from SIP. In one embodiment, serviceIri includes:

CSID, i.e., the communication session identifier used to correlate the user-related-signaling to the original message, X2 or X3 (here, X2 and X3 are the interfaces between the network element and the mediation function to provide IRI and CC, respectively as labeled on the arrows between 120 and 124/126 in FIG. 1);

originMessageType (e.g., X2 or X3 which indicate where the user-related signaling was found);

serviceID (i.e., a service identified such as RCS IM);

userRelatedSignalingType (type of user-related signaling specific of a service, such as, IMDN content);

userRelatedSignaling—user related signaling specific of a service (e.g. the IMDN content); and correlationID (i.e., a parameter used to correlate user-specific signaling and content).

The servicePayload message encapsulates user-related content extracted from X2 or X3 messages and delivered over HI3. Additionally, servicePayload includes service-specific info, user-related correlation, session-related correlation (i.e. CSID) to correlate the message with the message intercepted at a network level and the message itself. In one embodiment, servicePayload includes:

CSID (i.e., the communication session identifier);

originMessageType (e.g., X2 or X3 which indicate where was the user-related signaling found);

serviceID (i.e., a service identified such as RCS IM);

userRelatedContentType (i.e., type of user-related content specific of a service, such as, IM for RCS IM service);

userRelatedContent-user related signaling specific of a service (e.g. the IM content) and correlation ID (i.e., a parameter used to correlate user-specific signaling and content).

If the interception of CC is not allowed, the "serviceIri" is formatted to deliver user-related signaling for the specific service, but the "servicePayload" is blocked.

Figure 10:
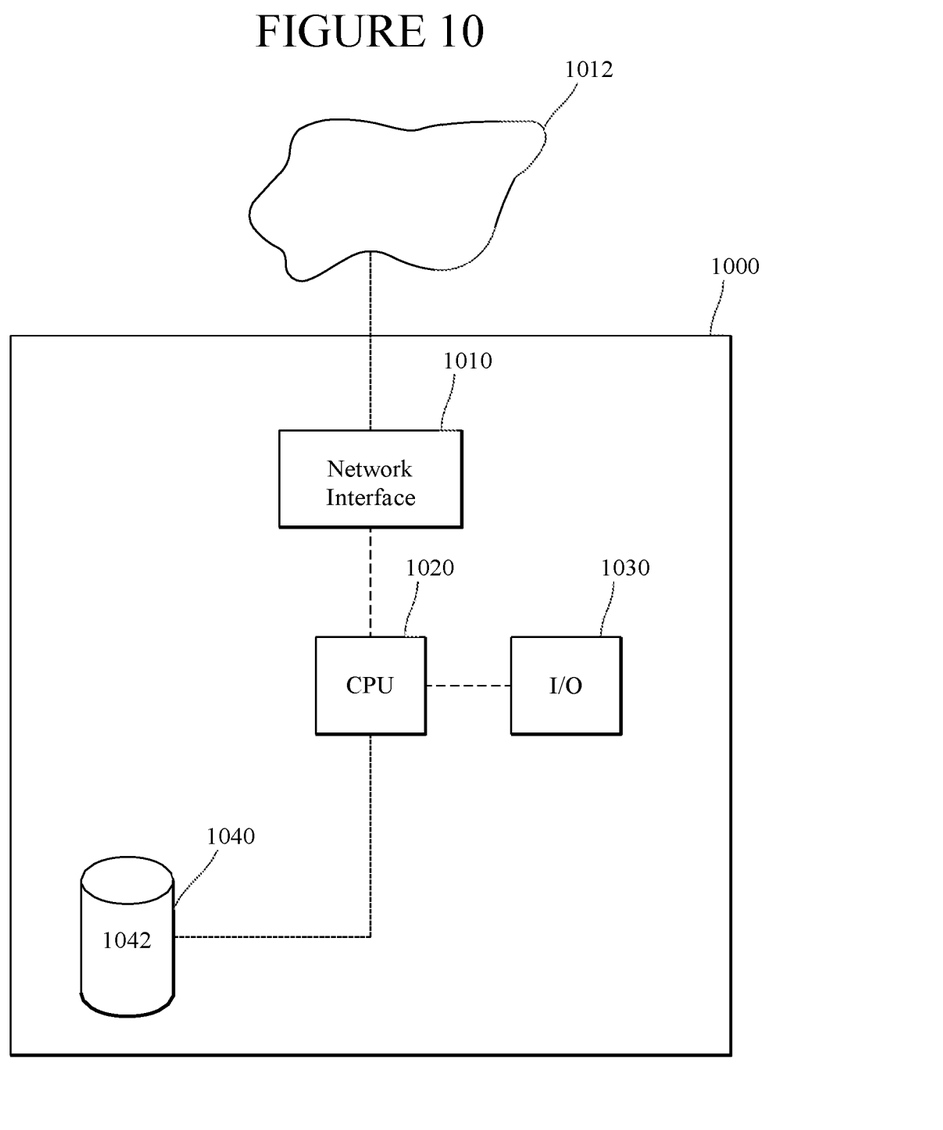
FIG. 10 is a block diagram of a CSP device according to another embodiment.

FIG. 10 is a schematic diagram of a device 1000 of a CSP (i.e., a CSP device) according to an embodiment. The CSP device 1000, which may be an IMS node and/or may also implement the LI mediation function/system to forward the IRI and/or CC to LEA, includes a communication interface 1010 and a processing unit 1020. The communication interface is configured to communicate via a network, such as a telecommunications wireless network.

Data processing unit 1020, which is connected to the communication interface 1010, is configured to extract LI data from one or more communications of an LI target (e.g. a User Equipment associated with a user identity, such as a public user identity in IMS) interacting with at least one core function of the network. Data processing unit 1020 is also configured to determine whether there is an association between the LI data and a service provided to the LI target via the network, and, if determined that the association exists, to generate one or more service-LI messages, which include service-specific information besides the LI data, to be forwarded to the LEA via the communication interface.

The CSP device 1000 may also include a memory 1040 and an operator interface 1030. The memory may store executable codes and/or a program 1042 that, when executed by the processing unit, make the device to perform any of the methods described in this section.

Figure 11:
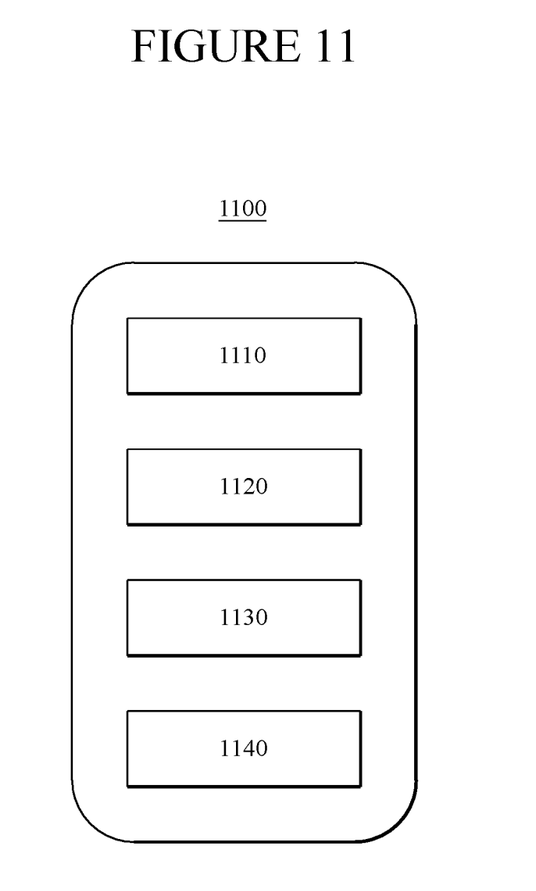
FIG. 11 is a block diagram of another CSP device according to yet another embodiment.

FIG. 11 is a block diagram of the CSP device 1100 according to another embodiment. The CSP device 1100 includes a transceiver 1110 configured to receive a communication of an LI target interacting with at least one core function of the network, and an LI data extraction module 1120 configured to extract LI data from the communication.

The CSP device 1100 further includes a service-LI data association seeker 1130 configured to determine whether there is an association between the LI data and a service provided to the LI target via the network, and a service-LI message generator 1140 configured, if determined that the association exists, to generate one or more service-LI messages, which include service-specific information besides the LI data, to be forwarded to the LEA, via the transceiver. Modules 1120, 1130 and 1140 may be implemented in hardware (e.g., on one or more processors and other electronic circuits) and/or software.

Thus, the embodiments disclosed in this section provide methods and network devices for lawful interception based on communications of an LI target with core network functions. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for lawful interception, LI, performed by a device of a communication service provider, CSP, the device having access to a communication of an LI target interacting with at least one core function of a network, the method comprising:

extracting LI data from the communication;
determining whether there is an association between the LI data and a IP Multimedia subsystem, IMS,-based service provided to the LI target via the network;
if when determined that the association exists, forwarding one or more service-LI messages, which include service-specific information besides the LI data, to a law enforcement agency, LEA,
wherein the LI data includes at least one of Intercept Related Information, IRI, and Content of Communication, CC; and
when the communication contains user-related signaling, forwarding a service-IRI, which is one of the service-LI messages, to the LEA, the service-IRI including the service-specific information besides the IRI extracted from the communication, wherein the service-specific information comprises the IRI extracted from the communication and a correlation identifier that correlates the IRI with other LI data.

2. The method of claim 1, wherein the determining is performed by a service function, SF, using a collection of service descriptions.

3. The method of claim 2, wherein a service description in the collection of service descriptions includes a service-identification rule, a service feature and a service policy.

4. The method of claim 3, wherein the service-specific information is generated according to the service policy.

5. The method of claim 1, wherein the service-IRI further includes a communication session identifier, an origin-message type, a service identifier, and a user-related-signaling type.

6. The method of claim 1, wherein the service-IRI is delivered via an LI handover interface for IRI reporting, HI2.

7. The method of claim 1, wherein the method further includes
when the communication contains user-related content, forwarding a service-CC, which is also one of the service-LI messages, to the LEA, the service-CC including the service-specific information besides the CC extracted from the communication.

8. The method of claim 7, wherein the service-CC includes a communication session identifier, an origin-message type, a service identifier, a user-related-content type, the CC and a correlation identifier usable to correlate the CC with other LI data.

9. The method of claim 7, wherein the service-CC is delivered via an LI handover interface for CC reporting, HI3.

10. A communications service provider, CSP, device for lawful interception, LI, the CSP device comprising:
a communication interface configured to communicate via a network; and
a data processing unit connected to the communication interface and configured:
to extract LI data from a communication of an LI target interacting with at least one core function of the network,
to determine whether there is an association between the LI data and a IP Multimedia subsystem, IMS,-based service provided to the LI target via the network;
when determined that the association exists, to generate one or more service-LI messages, which include service-specific information besides the LI data, to be forwarded to a law enforcement agency, LEA, via the communication interface, wherein the LI data includes at least one of Intercept Related Information, IRI, and Content of Communication, CC; and wherein when if the communication contains user-related signaling, the data processing unit generates a service-IRI, which is one of the service-LI messages, the service-IRI including the service-specific information besides the IRI extracted from the communication, wherein the service-specific information comprises the IRI extracted from the communication and a correlation identifier that correlates the IRI with other LI data.

11. The CSP device of claim 10, wherein the data processing unit executes a service function, SF, for determining whether the association exists, the SF using a collection of service descriptions.

12. The CSP device of claim 11, wherein a service description included in the collection of service descriptions includes a service-identification rule, a service feature and a service policy.

13. The CSP device of claim 12, wherein the data processing unit generates the service-specific information according to the service policy.

14. The CSP device of claim 10, wherein the service-IRI further includes a communication session identifier, an origin-message type, a service identifier, and a user-related-signaling type.

15. The CSP device of claim 10, wherein the communication interface forwards the service-IRI through an LI handover interface for IRI reporting, HI2.

16. The CSP device of claim 10, when the communication contains user-related content, the data processing unit generates a service-CC, which is also one of the service-LI messages, to be forwarded to the LEA via the communication interface,
wherein the service-CC includes the service-specific information besides the CC extracted from the communication.

17. The CSP device of claim 16, wherein the service-CC includes a communication session identifier, an origin-message type, a service identifier, a user-related-content type, the CC and a correlation identifier usable to correlate the CC with other LI data.

18. The CSP device of claim 16, wherein the communication interface forwards the service-CC through an LI handover interface for CC reporting, HI3.

* * * * *